US009945678B2

(12) United States Patent
Carter et al.

(10) Patent No.: US 9,945,678 B2
(45) Date of Patent: Apr. 17, 2018

(54) NAVIGATION SYSTEM WITH ARRIVAL TIME MECHANISM AND METHOD OF OPERATION THEREOF

(71) Applicant: Telenav, Inc., Santa Clara, CA (US)

(72) Inventors: Casey Carter, Sunnyvale, CA (US); Gregory Stewart Aist, Santa Clara, CA (US); Shalu Grover, Sunnyvale, CA (US); Aliasgar Mumtaz Husain, Milpitas, CA (US); Naveen Kumar Vandanapu, Sunnyvale, CA (US)

(73) Assignee: Telenav, Inc., Santa Clara, CA (US)

( * ) Notice: Subject to any disclaimer, the term of this patent is extended or adjusted under 35 U.S.C. 154(b) by 0 days.

(21) Appl. No.: 15/139,595

(22) Filed: Apr. 27, 2016

(65) Prior Publication Data

US 2017/0314939 A1 Nov. 2, 2017

(51) Int. Cl.
*G01C 21/34* (2006.01)

(52) U.S. Cl.
CPC .................................... *G01C 21/34* (2013.01)

(58) Field of Classification Search
None
See application file for complete search history.

(56) References Cited

U.S. PATENT DOCUMENTS

| 2014/0249747 | A1* | 9/2014 | Kosseifi | G01C 21/3415 |
| | | | | 701/428 |
| 2015/0142307 | A1* | 5/2015 | Nishino | G01C 21/34 |
| | | | | 701/465 |
| 2015/0302743 | A1* | 10/2015 | Hao | G01C 21/26 |
| | | | | 701/117 |
| 2017/0001638 | A1* | 1/2017 | Yoon | B60W 50/0097 |

* cited by examiner

*Primary Examiner* — Lail A Kleinman
(74) *Attorney, Agent, or Firm* — Perspectives Law Group

(57) ABSTRACT

A method of operation of a navigation system includes: determining a destination; determining a target arrival time for traversing to the destination; generating a preferred route based on the target arrival time for arriving at the destination using the preferred route at or before the target arrival time; and communicating the preferred route for providing navigational guidance to the destination.

20 Claims, 6 Drawing Sheets

NAVIGATION SYSTEM WITH ARRIVAL TIME MECHANISM AND METHOD OF OPERATION THEREOF

TECHNICAL FIELD

An embodiment of the present invention relates generally to a navigation system, and more particularly to a system with arrival time mechanism.

BACKGROUND ART

Modern consumer and industrial electronics, especially devices such as graphical navigation systems, televisions, projectors, cellular phones, portable digital assistants, and combination devices, are providing increasing levels of functionality to support modern life including location-based information services. Research and development in the existing technologies can take a myriad of different directions.

As users become more empowered with the growth of mobile communication technology, new and old paradigms begin to take advantage of this new space. One such space is regarding the use of location. The possible applications for providing necessary and relevant information to the user based on the location have not yet been fully utilized.

Thus, a need still remains for a navigation system with an arrival time mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

An embodiment of the present invention provides a method of operation of a navigation system including: determining a destination; determining a target arrival time for traversing to the destination; generating with a control circuit a preferred route based on the target arrival time for arriving at the destination using the preferred route at or before the target arrival time; and communicating the preferred route for providing navigational guidance to the destination.

An embodiment of the present invention provides a navigation system, including: a control circuit configured to: determine a destination, determine a target arrival time for traversing to the destination, generate a preferred route based on the target arrival time for arriving at the destination using the preferred route at or before the target arrival time; and an interface, coupled to the control circuit, configured to communicate the preferred route for providing navigational guidance to the destination.

An embodiment of the present invention provides a non-transitory computer readable medium including instructions for a navigation system, including: determining a destination; determining a target arrival time for traversing to the destination; generating a preferred route based on the target arrival time for arriving at the destination using the preferred route at or before the target arrival time; and communicating the preferred route for providing navigational guidance to the destination.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
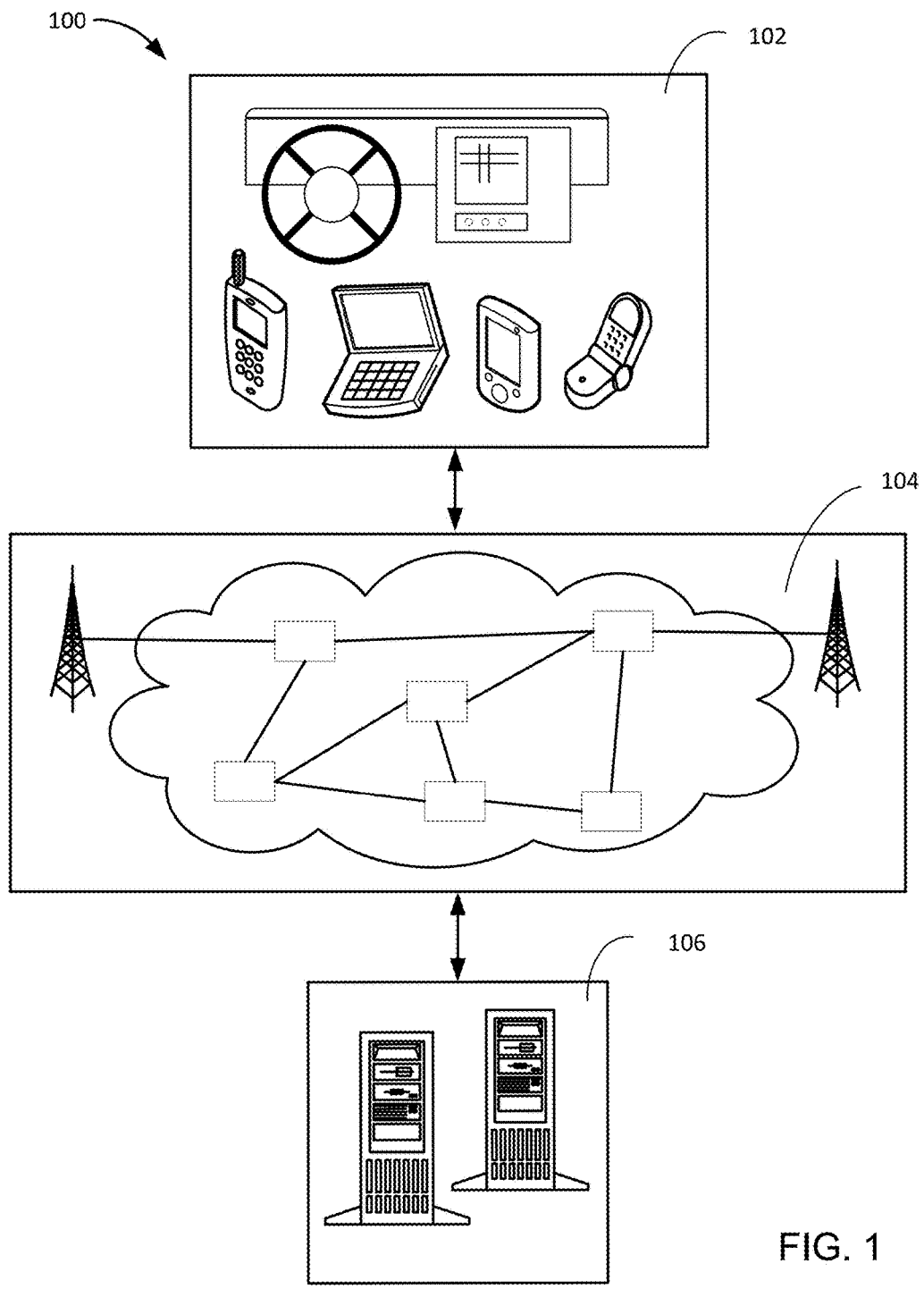
FIG. 1 is a navigation system with an arrival time mechanism in an embodiment of the present invention.

The following embodiments of the present invention provide a set of navigation-related functionalities utilizing a fixed value of target arrival time as a basis for route calculation and other navigational functionalities instead of as a consequential output of routes calculated using other conditions. The arrival time can be fixed rather than calculated as a consequence or an estimated result based on a specific navigation route. Using the fixed value of the estimated target arrival time as a basis, a minimum speed of travel for a route or a route segment therein can be determined for evaluating and traversing the navigation route or the route segment therein for arriving before or at the fixed target arrival time. Additional features or functions can be provided utilizing the basis of the fixed target arrival time, including processing multiple different travel modes.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

One skilled in the art would appreciate that the format with which navigation information is expressed is not critical to some embodiments of the invention. For example, in some embodiments, navigation information is presented in the format of (X, Y); where X and Y are two coordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein can include the navigation information described as well as information relating to points of interest to the user, such as local business, hours of businesses, types of businesses, advertised specials, traffic information, maps, local events, and location based community or personal information.

The term "module" referred to herein can include or be implemented as software, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium having instructions for performing the software function, a portion therein, or a combination thereof.

Referring now to FIG. 1, therein is shown a navigation system 100 with an output control mechanism in an embodiment of the present invention. The navigation system 100 includes a first device 102, such as a client or a server, connected to a second device 106, such as a client or server. The first device 102 can communicate with the second device 106 with a network 104, such as a wireless or wired network.

For example, the first device 102 can be of any of a variety of display devices, such as a cellular phone, personal digital assistant, a notebook computer, automotive telematics navigation system, or other multi-functional mobile communication or entertainment device. The first device 102 can couple, either directly or indirectly, to the network 104 to communicate with the second device 106 or can be a stand-alone device. The first device 102 further can be separate from or incorporated with a vehicle, such as a car, truck, bus, or train.

For illustrative purposes, the navigation system 100 is described with the first device 102 as a mobile computing device, although it is understood that the first device 102 can be different types of devices. For example, the first device 102 can also be a non-mobile computing device, such as a server, a server farm, or a desktop computer.

The second device 106 can be any of a variety of centralized or decentralized computing devices, or video transmission devices. For example, the second device 106 can be a computer, grid computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the network 104 to communicate with the first device 102. The second device 106 can also be a client type device as described for the first device 102.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with the vehicle, such as the car, the truck, the bus, or the train.

Also for illustrative purposes, the navigation system 100 is described with the second device 106 as a computing device, although it is understood that the second device 106 can be different types of devices. Also for illustrative purposes, the navigation system 100 is shown with the second device 106 and the first device 102 as end points of the network 104, although it is understood that the navigation system 100 can have a different partition between the first device 102, the second device 106, and the network 104. For example, the first device 102, the second device 106, or a combination thereof can also function as part of the network 104.

The network 104 can span and represent a variety of networks. For example, the network 104 can include wireless communication, wired communication, optical, ultrasonic, or a combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the network 104. Further, the network 104 can traverse a number of network topologies and distances. For example, the network 104 can include direct connection, personal area network (PAN), local area network (LAN), metropolitan area network (MAN), wide area network (WAN), or a combination thereof.

Figure 2:
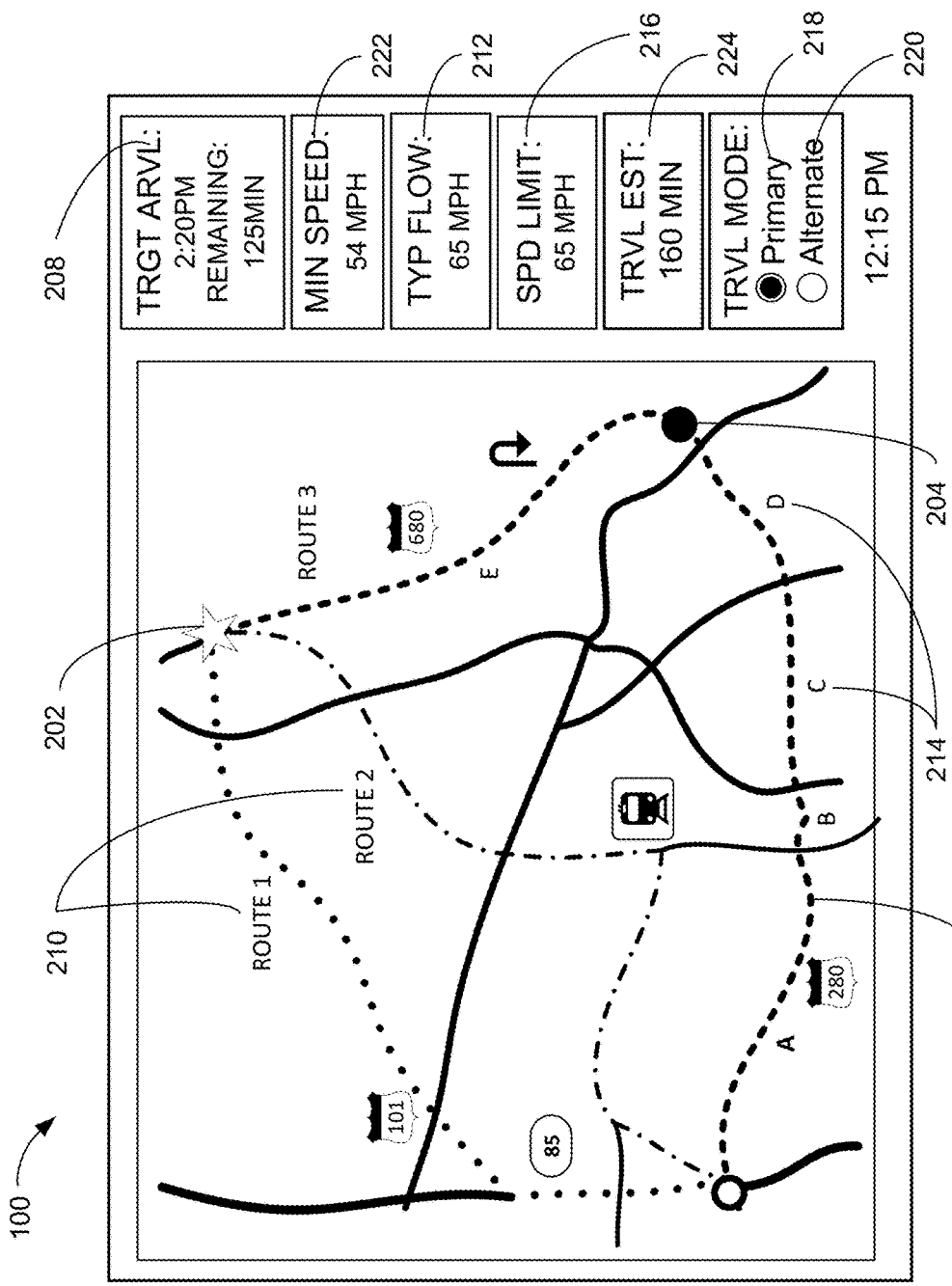
FIG. 2 is an example of a display interface for the navigation system.

Referring now to FIG. 2, therein is shown an example of navigation routes for the navigation system 100. The navigation system 100 can determine a destination 202 and further generate the navigation routes for travel to the destination 202. Each of the navigation routes can include a continuous set of paths, segments, nodes, or a combination thereof for traversing to the destination 202. The navigation routes can include a visual representation of the paths, segments, nodes, or a combination thereof, a set of maneuvers required to follow or traverse the route, a listing of locations and directions, or a combination thereof. The navigation routes can start from a current location 204 or a starting point and provide the continuous route to the destination 202.

The destination 202 can represent a desired end location of the navigation route. The destination 202 can be represented as an X-Y coordinate set, GPS coordinate, longitudinal value, latitudinal value, a set of intersecting streets, an address including a number block and an associated street name, or a combination thereof. For example, the destination 202 can be 1234 Main Street or (37.386358, −122.004635). The destination 202 can thither be represented by a location on a map corresponding to and visually representing a geographic location.

The destination 202 can be generated or provided by the user, the navigation system 100, or a combination thereof. For example, the destination 202 can be provided by the user through a user interface (not shown), identified by the navigation system 100, such as for the next appointment on the user's calendar, determined through communication between the user and another party, or a combination thereof.

The starting point can represent a location for commencement of the navigation route. The starting point can represent and correspond to the current location 204 or a location different than the current location 204. The starting point can be represented as an X, Y coordinate, GPS coordinate, longitudinal value, latitudinal value, number block followed by a street name, or a combination thereof. For example, the starting point can be 3456 South Road or N37° 22.6458', W121° 58.0693'.

The current location 204 can be a location of the first device 102 of FIG. 1 at a current time. The current location 204 can include a set of coordinates, an address, a landmark, a set of intersecting streets, or a combination thereof similar in type as the starting point and the destination 202. The current location 204 can be displayed or indicated on the navigation map by a continuously updated indicator or icon.

The navigation system 100 can calculate a preferred route 206, a characteristic or a requirement for traversing the preferred route 206, or a combination thereof based on a target arrival time 208. The preferred route 206 can represent the navigation route for travel from the starting point to the destination 202 for meeting the target arrival time 208.

The preferred route 206 can be an instance of the navigation route for traversing and arriving at the destination 202 at the latest by the target arrival time 208. The preferred route 206 can include the navigation route determined or estimated to allow a user of the navigation system 100 to traverse and arrive at the destination 202 at or before the target arrival time 208.

The target arrival time 208 is a time associated with arrival at the destination 202. The target arrival time 208 can be a limit or a threshold associated with arrival at the destination 202, including a latest possible time of arrival applicable for the user. The target arrival time 208 can include a calendar day, a time of day, or a combination thereof.

The target arrival time 208 can correspond to an estimated time of arrival associated with a method of travel, a specific route of travel, a rate of travel, or a combination thereof in traveling to the destination 202. The target arrival time 208 can be generated or provided by the user, the navigation system 100, or a combination thereof. For example, the target arrival time 208 can be provided through the user interface, provided as a setting for the navigation system 100, or determined from a content received by the navigation system 100.

The navigation system 100 can utilize the target arrival time 208 as a fixed value or a requirement in processing the preferred route 206 or associated characteristics. The navigation system 100 can calculate the preferred route 206, process other necessary requirements, or a combination thereof using the fixed value or the requirement of the target arrival time 208 as a basis or a required condition instead of calculating an estimated time of arrival as a byproduct of the calculated route or a user's selection.

The navigation system 100 can use the target arrival time 208 as a basis, a requirement, a framework, or a combination thereof in providing navigational functions or features, including calculating of the preferred route 206. The navigation system 100 can use the target arrival time 208 for evaluating various potential routes, travel mode or methods, or a combination thereof.

The navigation system 100 can determine the preferred route 206 from candidate routes 210. The candidate routes 210 can represent potential navigation routes for traveling from the starting point or the current location 204 to the destination 202. For example, route 1 can take the user along a freeway with a typical flow rate 212 of "70 MPH" for the entire route, route 2 can take the user along surface streets where the typical flow rate 212 is "35 MPH" for the entire route, and route 3 can take the user along a combination of freeway and surface streets.

The candidate routes 210 can each include a continuous set of paths, route segments 214, nodes, or a combination thereof for traversing from the starting point or the current location 204 to the destination 202. The route segments 214 can each represent a portion within the route, such as one or more subsets of a continuous set or grouping of paths, nodes, or a combination thereof.

The route segments 214 can be identified based on a common type or characteristic, a common name, or a combination thereof for the continuous path or the continuous portion within the route. For example, the route segments 214 can be identified based on the typical flow rate 212, a road type, a speed limit 216, traffic flow patterns, nodes, or a combination thereof.

The route segments 214 can further be based on a method of travel for the user, such as for a primary travel mode 218 or an alternate travel mode 220. For example, the primary travel mode 218 can represent a method of travel most common or currently applicable to the user, including travel using a vehicle controlled by the user.

The alternate travel mode 220 can represent a secondary mode of travel for the user, different than the primary travel mode 218, to arrive at the destination 202. Continuing with the example, the alternate travel mode 220 can include any means of transport including personal, hired transportation, public transportation, walking, bicycling, or a combination thereof available or applicable to the user. As a more specific example, one of the candidate routes 210 can include the route segments 214 based on walking to a train station to take a train to a neighboring city, the train route, then hiring a car service for travel from the train station to the destination 202, or a combination thereof.

The typical flow rate 212 can represent the normal rate of travel on the route segments 214. The typical flow rate 212 can describe an average travel speed for a geographic location based on a condition, a time of day, or a combination thereof. The typical flow rate 212 can be based on a schedule, transportation databases, historical data, real time networked servers, or a combination thereof. For example, the typical flow rate 212 can include a scheduled bus service route time or a historical travel speed along the route segments 214.

The navigation system 100 can calculate a minimum speed 222 for each of the route segments 214 to arrive at the destination 202 at or before the target arrival time 208. The minimum speed 222 can represent a speed that the user must maintain over each of the corresponding instance of the route segments 214 in order to arrive before or at the target arrival time 208.

The minimum speed 222 can be updated as the user travels along the preferred route 206. For example, the minimum speed 222 can be updated based on the a rate of progress or a status of the user, based on the current location 204 and remaining portions of corresponding route, based on road conditions or traffic flow the remaining portions of the corresponding route, or a combination thereof.

The navigation system 100 can calculate a travel time estimate 224 based on the preferred route 206, the typical flow rate 212 for the route segments 214, the minimum speed 222 for the route segments 214, or a combination thereof. The travel time estimate 224 can represent the time the user would need or spend to travel on the navigation route from the starting point or the current location 204 to the destination 202.

The speed limit 216 can represent the rate of travel at a location. The speed limit 216 can include the maximum rate of travel allowable at a location or a suggested rate of travel at the location. The speed limit 216 can represent an upper boundary condition for the minimum speed 222. The navigation system 100 can use the speed limit 216 to determine the feasibility of traveling at the minimum speed 222 to arrive at the target arrival time 208.

Figure 3:
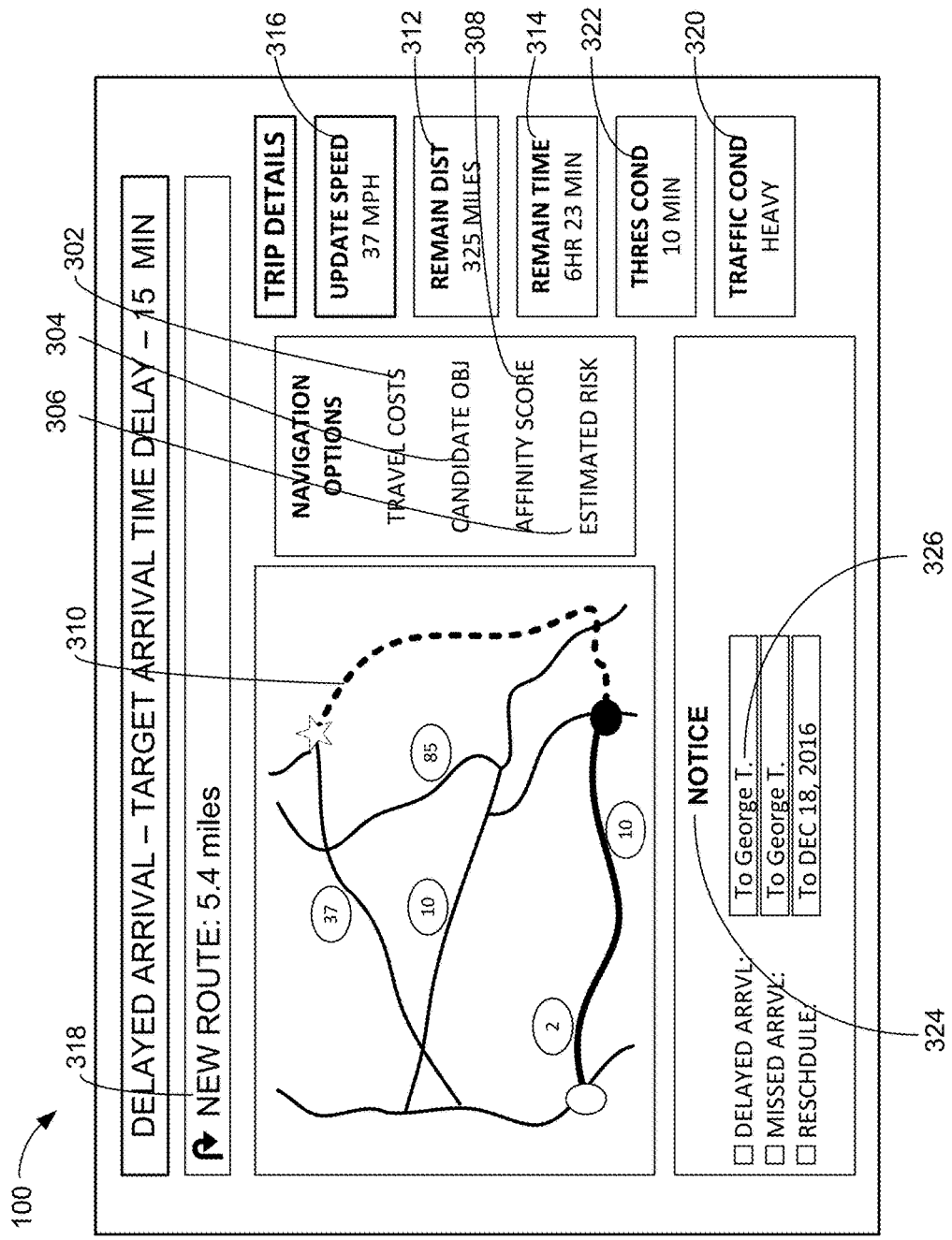
FIG. 3 is an example of a settings display interface for the navigation system.

Referring now to FIG. 3, therein is shown an example of a display screen for the navigation system 100. The display screen can display preferences for determining the preferred route 206 of FIG. 2. The display screen can include options for travel costs 302, candidate objectives 304, an estimated risk 306, or a combination thereof.

The travel costs 302 can represent the value estimated for arriving at the destination 202. The travel costs 302 can include measures or amounts of money, time, physical effort, or a combination thereof. For example, the travel costs 302 can include the monetary price of parking, tolls, and gas for traveling to the destination 202 of FIG. 2. In another example, the travel costs 302 can include the time involved in taking a shuttle from an airport. In a further example, the travel costs 302 can include a measure or an estimate of the physical effort of walking to the destination 202 from a parking space.

The travel costs 302 can further include future consequences of arriving at the destination 202 at or before the target arrival time 208 of FIG. 2. For example, the travel costs 302 can include additional financial costs of rescheduling a flight or no-show hotel charges. In a further example, the travel costs 302 can include battery charge for an electric vehicle. The navigation system 100 can calculate the preferred route 206 insuring the battery charge for the electric vehicle does not decrease below 50% for a single trip in preserving enough charge to return "home".

The travel costs 302 can include a benefit to the user. For example, the travel costs 302 can include a physical energy, such as a number of steps or an estimated calorie expenditure, associated with traveling to the destination 202. The travel costs 302 for the physical energy can be processed as a health benefit to the user by adjusting the physical effort required to arrive at the destination 202. The navigation system 100 can calculate the preferred route 206 to include sufficient time and a stop to increase the physical effort of the user, such as selecting a parking lot to increase the number of steps the user would need to take to arrive at the destination 202.

In a further example, the travel costs 302 can include a representation of safety of the user, such as based on crime rate for the corresponding location. The navigation system 100 can calculate the preferred route 206 to avoid unfamiliar route segments or high crime areas to increase safety for the user. The navigation system 100 can further utilize the travel costs 302 of time to calculate the safest route for the user.

The candidate objectives 304 can each represent a preference or a goal associated with arriving at an interest point along the navigation route. The candidate objectives 304 can be associated with a stop or a pause, a delay, a time duration, or a combination thereof at the interest point in traversing the navigation route. For example, the candidate objectives 304 can include tourist attractions on a sightseeing tour, packages for delivery associated with locations along a delivery route, or bathroom stops along a vacation travel route.

The candidate objectives 304 can include an affinity score 308. The affinity score 308 can represent an urgency, importance, desirability, popularity, or combination thereof for meeting or satisfying the preference or the goal. For example, along a freight route, the affinity score 308 for delivering a perishable item by a specific time can be higher than delivering a non-perishable item without any reasonable time limitation for damaging the contents of the package. In a further example, on a sightseeing tour, the tourist attractions can be assigned the affinity score 308 based on popularity with tour participants.

The estimated risk 306 can represent the amount of exposure to undesirable consequences the user is willing to accept to arrive at the destination 202 at the target arrival time 208. For example, the estimated risk 306 can include a risk of traveling faster than a suggested speed limit, the risk of damage to a vehicle from road conditions, or the risk of an accident from traveling on unfamiliar roads.

The estimated risk 306 can be represented with a value corresponding to an event or a status. For example, the estimated risk 306 can be represented as a percentage value or a likelihood value, a rating based on a predetermined system, or a combination thereof. The estimated risk 306 can further correspond to a possible or an associated outcome or result, such as an undesirable traffic event, damage to the vehicle, the accident, or a combination thereof.

The display screen can also display a navigation map with the preferred route 206, a remaining route 310, route details for the remaining route 310, or a combination thereof. The route details can include a remaining distance 312, a remaining time 314, an updated speed 316, or a combination thereof. As the user progresses along the navigation route, the navigation system 100 can suggest a new route 318 based on traffic conditions 320 and a threshold condition 322 for traveling to the new route 318.

The remaining route 310 can represent portion of the preferred route 206 connecting the current location 204 of FIG. 2 to the destination 202. The remaining route 310 can be continuously monitored or updated as the user travels toward the destination 202. The navigation system 100 can monitor route conditions along the remaining route 310. For example, the navigation system 100 can monitor or update the remaining distance 312, the remaining time 314, the traffic conditions 320, bus route delays, for hire service confirmations, or a combination thereof.

The updated speed 316 can represent the minimum speed 222 of FIG. 2 for the current location 204 based on the remaining route 310, the remaining time 314, the current location 204, user's progress or status in traversing the preferred route 206 to the current location 204, or a combination thereof. For example, the updated speed 316 can be increased when travel along the navigation route has been delayed due to an unexpected stop, heavy traffic, average travel speed below the minimum speed 222, or a combination thereof.

The remaining distance 312 can represent the distance of the remaining route 310. The remaining distance 312 can include the distance left to travel along the preferred route 206. The remaining distance 312 can include the distance from the current location 204 to the destination 202 along the preferred route 206. The remaining distance 312 can be continuously updated as the user travels towards the destination 202. The remaining time 314 can represent the difference between the current time and the target arrival time 208.

The traffic conditions 320 can represent conditions on or along the navigation route based on usage. The traffic conditions 320 can result in changes in traveling speeds, trip times, vehicular queuing, change in or deviation from the typical flow rate 212 of FIG. 2, or a combination thereof. The navigation system 100 can continuously monitor or update the traffic conditions 320 to determine the navigation route with the greatest rate of travel.

The traffic conditions 320 can be determined by peer to peer notification, Doppler radar, vehicle speed monitoring, networked travel information, a real-time sensor, visual optical inspection, or a combination thereof. For example, the traffic conditions 320 can be determined based on changes in the vehicle speed compared with typical vehicle speed along the route segments 214 of FIG. 2 or on-board computer vision methods.

The traffic conditions 320 can be displayed on the display interface. For example, the traffic conditions 320 can be shown as a weather condition or an average travel speed at one or more locations on or associated with the remaining route 310.

Also for example, the traffic conditions 320 can be assigned descriptors such as "LIGHT", "MODERATE", or "HEAVY" corresponding to road usage. In a further example, the descriptor "LIGHT", can be used when the road usage is minimal and the vehicles on the road can travel at the speed limit 216 of FIG. 2 or higher, and the descriptor "HEAVY", can be used when the road usage is higher than normal and the vehicles on the road travel slower than the speed limit 216 due to traffic congestion. The navigation system 100 can use a method, a process, an equation, or a combination thereof predetermined by the navigation system 100 to determine the traffic conditions 320.

The new route 318 can represent an alternate route for arriving at the destination 202. The new route 318 can include a continuous set of paths, segments, nodes, or a combination thereof for traversing from the current location 204 or starting point to the destination 202. The new route 318 can be determined from the candidate routes 210 of FIG. 2 calculated from the current location 204 to the destination 202 for arriving at or before the target arrival time 208. The new route 318 can be an update, an adjustment, an alternate selection, or a combination thereof in relation to the preferred route 206. As a more specific example, the new route 318 can update or replace the remaining route 310.

The threshold condition 322 can represent a limit for evaluating or implementing the new route 318. The threshold condition 322 can be used for triggering the calculation of the new route 318 or presentation of the new route 318 to the user. The threshold condition 322 can further represent an amount of time the user can remain in current traffic conditions before needing to alter the preferred route 206.

The threshold condition 322 can be updated as the user travels based on the traffic conditions 320, the remaining time 314, the remaining distance 312, or combination thereof. The threshold condition 322 can be based on a rate of change in the minimum speed 222 for the remaining route 310, the remaining distance 312, the remaining time 314, the typical flow rate 212 of FIG. 2, or a combination thereof.

The navigation system 100 can generate a notice 324 based on a late arrival. The notice 324 can represent an alert, a signal, a flag, or combination thereof to indicate the late arrival. The notice 324 can be transmitted or generated from the first device 102 of FIG. 1 to the user, the network 104 of FIG. 1, the second device 106 of FIG. 1, a further user or a corresponding device thereto, or a combination thereof. The notice 324 can also be relayed to a storage device for later retrieval by the first device 102.

The notice 324 can include a cause condition for the late arrival past the target arrival time 208. The cause condition for the late arrival can represent a change in a condition along the route. The cause condition for the late arrival can include an event or a condition which causes a delay for the user. For example, the condition for the late arrival can be an accident on the freeway, a train schedule delay, or road construction along the side street delaying traffic.

The notice 324 can also include a communication to a participant 326 associated with the destination 202. The notice 324 can also include communicating the late arrival to the participant 326. For example, the notice 324 can be a text message indicating a new arrival time or an appointment request to reschedule the meeting.

The participant 326 can represent a party associated with the destination 202, the target arrival time 208, or a combination thereof. For example, the participant 326 can be a friend waiting to meet the user for lunch, a check-in desk at a doctor's office, or a database for delivery tracking.

Figure 4:
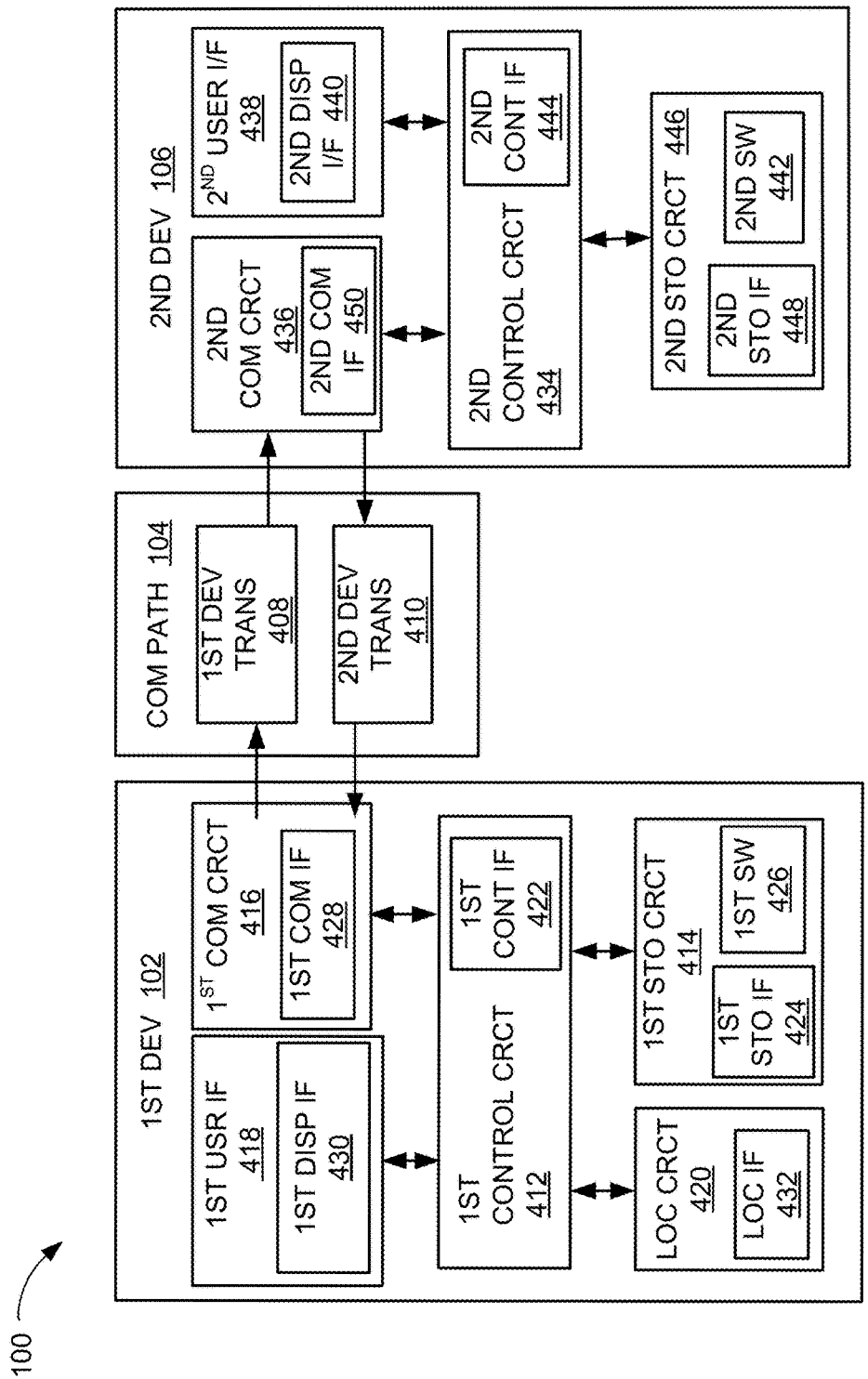
FIG. 4 is an exemplary block diagram of the navigation system.

Referring now to FIG. 4, therein is shown an exemplary block diagram of the navigation system 100. The navigation system 100 can include the first device 102, the network 104, and the second device 106. The first device 102 can send information in a first device transmission 408 over the network 104 to the second device 106. The second device 106 can send information in a second device transmission 410 over the network 104 to the first device 102.

For illustrative purposes, the navigation system 100 is shown with the first device 102 as a client device, although it is understood that the navigation system 100 can have the first device 102 as a different type of device. For example, the first device 102 can be a server having a display interface.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control circuit 412, a first storage circuit 414, a first communication circuit 416, and a first user interface 418, and a location circuit 420. The first control circuit 412 can include a first control interface 422. The first control circuit 412 can execute a first software 426 to provide the intelligence of the navigation system 100.

The first control circuit 412 can be implemented in a number of different manners. For example, the first control circuit 412 can be a processor, an application specific integrated circuit (ASIC) an embedded processor, a microprocessor, a hardware control logic, a hardware finite state machine (FSM), a digital signal processor (DSP), or a combination thereof. The first control interface 422 can be used for communication between the first control circuit 412 and other functional circuits in the first device 102. The first control interface 422 can also be used for communication that is external to the first device 102.

The first control interface 422 can receive information from the other functional circuits or from external sources, or can transmit information to the other functional circuits or to external destinations. The external sources and the external destinations refer to sources and destinations external to the first device 102.

The first control interface 422 can be implemented in different ways and can include different implementations depending on which functional circuits or external circuits are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The first storage circuit 414 can store the first software 426. The first storage circuit 414 can also store the relevant information, such as data representing incoming images, data representing previously presented image, sound files, or a combination thereof.

The first storage circuit 414 can be a volatile memory, a nonvolatile memory, an internal memory, an external memory, or a combination thereof. For example, the first storage circuit 414 can be a nonvolatile storage such as non-volatile random access memory (NVRAM), Flash memory, disk storage, or a volatile storage such as static random access memory (SRAM).

The first storage circuit 414 can include a first storage interface 424. The first storage interface 424 can be used for communication between the first storage circuit 414 and other functional circuits in the first device 102. The first storage interface 424 can also be used for communication that is external to the first device 102.

The first storage interface 424 can receive information from the other functional circuits or from external sources, or can transmit information to the other functional circuits or to external destinations. The external sources and the external destinations refer to sources and destinations external to the first device 102.

The first storage interface 424 can include different implementations depending on which functional circuits or external circuits are being interfaced with the first storage circuit 414. The first storage interface 424 can be implemented with technologies and techniques similar to the implementation of the first control interface 422.

The first communication circuit 416 can enable external communication to and from the first device 102. For example, the first communication circuit 416 can permit the first device 102 to communicate with the second device 106, an attachment, such as a peripheral device or a desktop computer, and the network 104.

The first communication circuit 416 can also function as a communication hub allowing the first device 102 to function as part of the network 104 and not limited to be an end point or terminal circuit to the network 104. The first communication circuit 416 can include active and passive components, such as microelectronics or an antenna, for interaction with the network 104.

The first communication circuit 416 can include a first communication interface 428. The first communication interface 428 can be used for communication between the first communication circuit 416 and other functional circuits in the first device 102. The first communication interface 428 can receive information from the other functional circuits or can transmit information to the other functional circuits.

The first communication interface 428 can include different implementations depending on which functional circuits are being interfaced with the first communication circuit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, a camera, an infrared sensor for receiving remote signals, or any combination thereof to provide data and communication inputs.

The first user interface 418 can include a first display interface 430. The first display interface 430 can include an output device. The first display interface 430 can include a display, a projector, a video screen, a speaker, or any combination thereof.

The first control circuit 412 can operate the first user interface 418 to display information generated by the navigation system 100. The first control circuit 412 can also execute the first software 426 for the other functions of the navigation system 100, including receiving location information from the location circuit 420. The first control circuit 412 can further execute the first software 426 for interaction with the network 104 via the first communication circuit 416.

The location circuit 420 can generate location information, current heading, current acceleration, and current speed of the first device 102, as examples. The location circuit 420 can be implemented in many ways. For example, the location circuit 420 can function as at least a part of the global positioning system, an inertial navigation system, a cellular-tower location system, a pressure location system, or any combination thereof. Also, for example, the location circuit 420 can utilize components such as an accelerometer or GPS receiver.

The location circuit 420 can include a location interface 432. The location interface 432 can be used for communication between the location circuit 420 and other functional circuits in the first device 102. The location interface 432 can also be used for communication external to the first device 102.

The location interface 432 can receive information from the other functional circuits or from external sources, or can transmit information to the other functional circuits or to external destinations. The external sources and the external destinations refer to sources and destinations external to the first device 102.

The location interface 432 can include different implementations depending on which functional circuits or external circuits are being interfaced with the location circuit 420. The location interface 432 can be implemented with technologies and techniques similar to the implementation of the first control circuit 412.

The second device 106 can be optimized for implementing an embodiment of the present invention in a multiple device embodiment with the first device 102. The second device 106 can provide the additional or higher performance processing power compared to the first device 102. The second device 106 can include a second control circuit 434, a second communication circuit 436, a second user interface 438, and a second storage circuit 446.

The second user interface 438 allows a user (not shown) to interface and interact with the second device 106. The second user interface 438 can include an input device and an output device. Examples of the input device of the second user interface 438 can include a keypad, a touchpad, softkeys, a keyboard, a microphone, a camera, or any combination thereof to provide data and communication inputs. Examples of the output device of the second user interface 438 can include a second display interface 440. The second display interface 440 can include a display, a projector, a video screen, a speaker, or any combination thereof.

The second control circuit 434 can execute a second software 442 to provide the intelligence of the second device 106 of the navigation system 100. The second software 442 can operate in conjunction with the first software 426. The second control circuit 434 can provide additional performance compared to the first control circuit 412.

The second control circuit 434 can operate the second user interface 438 to display information. The second control circuit 434 can also execute the second software 442 for the other functions of the navigation system 100, including operating the second communication circuit 436 to communicate with the first device 102 over the network 104.

The second control circuit 434 can be implemented in a number of different manners. For example, the second control circuit 434 can be a processor, an embedded processor, a microprocessor, hardware control logic, a hardware finite state machine (FSM), a digital signal processor (DSP), or a combination thereof.

The second control circuit 434 can include a second control interface 444. The second control interface 444 can be used for communication between the second control circuit 434 and other functional circuits in the second device 106. The second control interface 444 can also be used for communication that is external to the second device 106.

The second control interface 444 can receive information from the other functional circuits or from external sources, or can transmit information to the other functional circuits or to external destinations. The external sources and the external destinations refer to sources and destinations external to the second device 106.

The second control interface 444 can be implemented in different ways and can include different implementations depending on which functional circuits or external circuits are being interfaced with the second control interface 444. For example, the second control interface 444 can be implemented with a pressure sensor, an inertial sensor, a microelectromechanical system (MEMS), optical circuitry, waveguides, wireless circuitry, wireline circuitry, or a combination thereof.

A second storage circuit 446 can store the second software 442. The second storage circuit 446 can also store the information such as data representing incoming images, data representing previously presented image, sound files, or a combination thereof. The second storage circuit 446 can be sized to provide the additional storage capacity to supplement the first storage circuit 414.

For illustrative purposes, the second storage circuit 446 is shown as a single element, although it is understood that the second storage circuit 446 can be a distribution of storage elements. Also for illustrative purposes, the navigation system 100 is shown with the second storage circuit 446 as a single hierarchy storage system, although it is understood that the navigation system 100 can have the second storage circuit 446 in a different configuration. For example, the second storage circuit 446 can be formed with different storage technologies forming a memory hierarchal system including different levels of caching, main memory, rotating media, or off-line storage.

The second storage circuit 446 can be a volatile memory, a nonvolatile memory, an internal memory, an external memory, or a combination thereof. For example, the second storage circuit 446 can be a nonvolatile storage such as non-volatile random access memory (NVRAM), Flash memory, disk storage, or a volatile storage such as static random access memory (SRAM).

The second storage circuit 446 can include a second storage interface 448. The second storage interface 448 can be used for communication between the second storage circuit 446 and other functional circuits in the second device 106. The second storage interface 448 can also be used for communication that is external to the second device 106.

The second storage interface 448 can receive information from the other functional circuits or from external sources, or can transmit information to the other functional circuits or to external destinations. The external sources and the external destinations refer to sources and destinations external to the second device 106.

The second storage interface 448 can include different implementations depending on which functional circuits or external circuits are being interfaced with the second storage circuit 446. The second storage interface 448 can be implemented with technologies and techniques similar to the implementation of the second control interface 444.

The second communication circuit 436 can enable external communication to and from the second device 106. For example, the second communication circuit 436 can permit the second device 106 to communicate with the first device 102 over the network 104.

The second communication circuit 436 can also function as a communication hub allowing the second device 106 to function as part of the network 104 and not limited to be an end point or terminal circuit to the network 104. The second communication circuit 436 can include active and passive components, such as microelectronics or an antenna, for interaction with the network 104.

The second communication circuit 436 can include a second communication interface 450. The second communication interface 450 can be used for communication between the second communication circuit 436 and other functional circuits in the second device 106. The second communication interface 450 can receive information from the other functional circuits or can transmit information to the other functional circuits.

The second communication interface 450 can include different implementations depending on which functional circuits are being interfaced with the second communication circuit 436. The second communication interface 450 can be implemented with technologies and techniques similar to the implementation of the second control interface 444.

The first communication circuit 416 can couple with the network 104 to send information to the second device 106 in the first device transmission 408. The second device 106 can receive information in the second communication circuit 436 from the first device transmission 408 of the network 104.

The second communication circuit 436 can couple with the network 104 to send information to the first device 102 in the second device transmission 410. The first device 102 can receive information in the first communication circuit 416 from the second device transmission 410 of the network 104. The navigation system 100 can be executed by the first control circuit 412, the second control circuit 434, or a combination thereof. For illustrative purposes, the second device 106 is shown with the partition having the second user interface 438, the second storage circuit 446, the second control circuit 434, and the second communication circuit 436, although it is understood that the second device 106 can have a different partition. For example, the second software 442 can be partitioned differently such that some or all of its function can be in the second control circuit 434 and the second communication circuit 436. Also, the second device 106 can include other functional circuits not shown in FIG. 4 for clarity.

The functional circuits in the first device 102 can work individually and independently of the other functional circuits. The first device 102 can work individually and independently from the second device 106 and the network 104.

The functional circuits in the second device 106 can work individually and independently of the other functional circuits. The second device 106 can work individually and independently from the first device 102 and the network 104.

The functional circuits described above can be implemented in hardware. For example, one or more of the functional circuits can be implemented using the a gate, circuitry, a processor, a computer, integrated circuit, integrated circuit cores, a pressure sensor, an inertial sensor, a microelectromechanical system (MEMS), a passive device, a physical non-transitory memory medium having instructions for performing the software function, a portion therein, or a combination thereof.

For illustrative purposes, the navigation system 100 is described by operation of the first device 102 and the second device 106. It is understood that the first device 102 and the second device 106 can operate any of the modules and functions of the navigation system 100.

Figure 5:
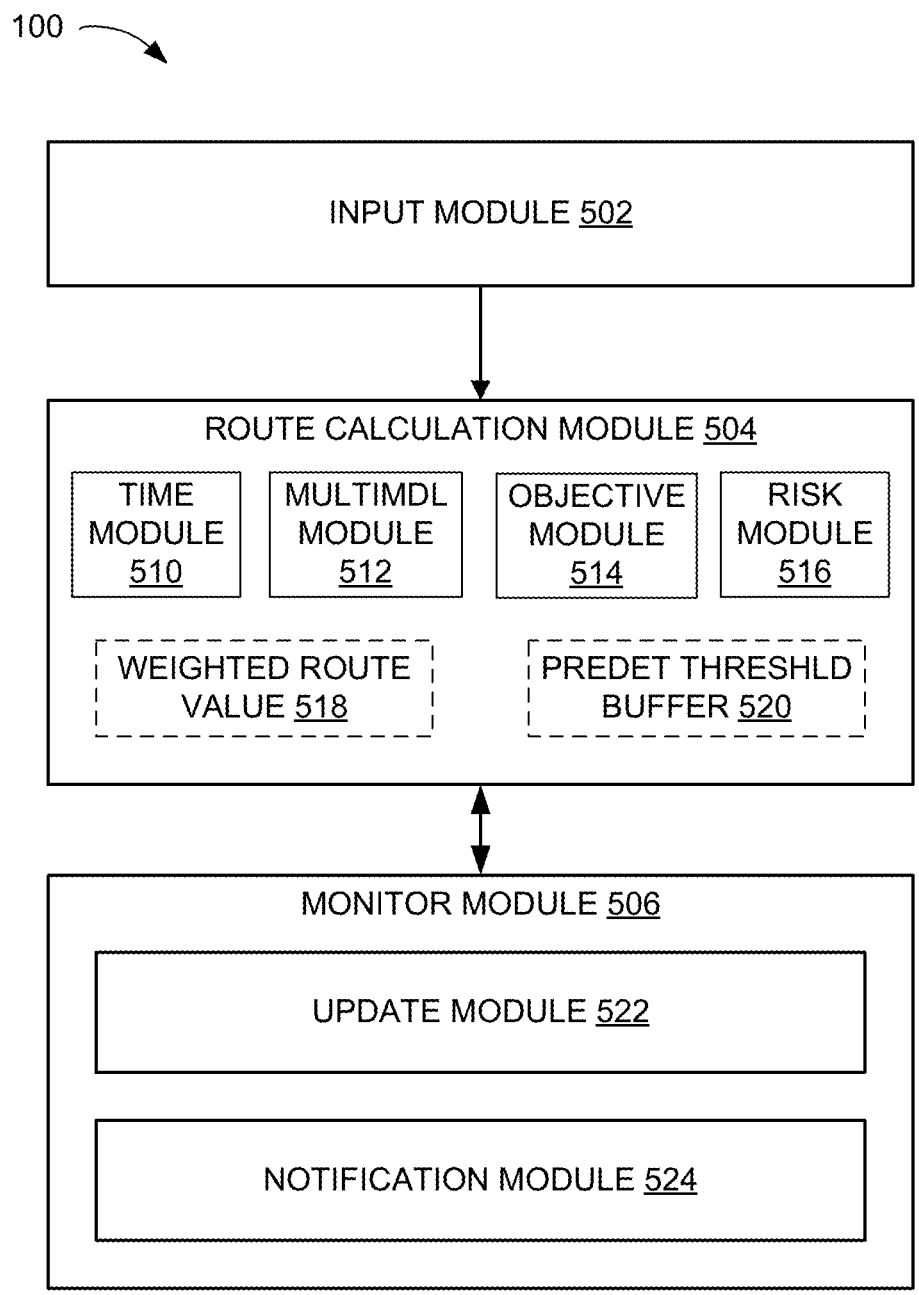
FIG. 5 is a control flow of the navigation system.

Referring now to FIG. 5, therein is shown a control flow of the navigation system 100. The navigation system 100 can include an input module 502, a route calculation module 504, a monitor module 506, or combination thereof. The input module 502 can be coupled to the route calculation module 504 using wired or wireless connections, by having an output of one module as an input of the other module, by having operations of one module influence operations of the other module, or a combination thereof. Similarly, the route calculation module 504 can be couple to the monitor module 506.

The input module 502 is configured to determine parameters for calculating the navigation route. The input module 502 can determine the parameters associated with the user traversing the navigation route.

For example, the input module 502 can determine the destination 202 of FIG. 2, the target arrival time 208 of FIG. 2, the participant 326 of FIG. 3, the candidate objectives 304 of FIG. 3, the affinity score 308 of FIG. 3, or combination thereof for the navigation route. The input module 502 can determine the destination 202 by receiving information from the user through one or more of the user interfaces, one or more of the communication circuits, or a combination thereof for the first device 102 of FIG. 1, the second device 106 of FIG. 1, or a combination thereof described above for FIG. 4.

The input module 502 can further determine the destination 202 by identifying or recognizing the parameters in user communications, calendar events, textual messages, emails, voicemails, stored information, advertisements or shortcuts, or a combination thereof. The input module 502 can identify parameters in various accessible information based on matching keywords, phrases, surrounding words, or a combination thereof predetermined by the navigation system 100.

The input module 502 can determine the destination 202 based on received information, such as information directly from the user or information from other sources causing response from the user, using the first user interface 418 of FIG. 4, the first control interface 422 of FIG. 4, the first storage interface 424 of FIG. 4, the first display interface 430 of FIG. 4, the location interface 432 of FIG. 4, the first communication interface 428 of FIG. 4, the second user interface 438 of FIG. 4, the second control interface 444 of FIG. 4, the second storage interface 448 of FIG. 4, the second communication interface 450 of FIG. 4, or a combination thereof. The input module 502 can further identify the destination 202 using the first control circuit 412 of FIG. 4, the second control circuit 434 of FIG. 4, or a combination thereof.

The input module 502 can store the destination 202 for retrieval at a later time using the first storage circuit 414 of FIG. 4, the second storage circuit 446 of FIG. 4, or a combination thereof. The input module 502 can determine the target arrival time 208, the participant 326, the candidate objectives 304, the affinity score 308, or a combination thereof in a similar fashion as described above.

The input module 502 can further calculate the affinity score 308. The input module 502 can calculate the affinity score 308 in a variety of ways. For example, the input module 502 can calculate the affinity score 308 based on previous specification or confirmation of the affinity score 308. The input module 502 can calculate based on averaging or selecting a specific instance of the previous affinity score.

Also for example, the input module 502 can calculate the affinity score 308 based on keywords or other contextual information. As a more specific example, the input module 502 can calculate the affinity score 308 based on keywords associated with urgency, importance, desirability, popularity, or combination thereof as predetermined by the navigation system 100. Also as a more specific example, the input module 502 can calculate the affinity score 308 based on calendar event associated with the target arrival time 208, such as the participant 326, meeting time, meeting location, purpose or objective of meeting, or a combination thereof.

In an illustrative example, the destination 202, the target arrival time 208, and the participant 326 for a navigation route can be identified from the calendar event "Dinner with Mom at 6 pm". The navigation system 100 can identify the parameters from within the user communication by matching keywords or by retrieving stored as string variables within the navigation system 100. The target arrival time 208 can be identified by the start time of the calendar event as 6 pm.

The navigation system 100 can further match keywords between the user communication and the received information stored on the navigation system 100. For example, the participant 326 can be identified within the title of the calendar event by matching the keyword "mom" with entries from the user's contact list. Finally, the destination 202 can be determined through the address listed for "mom" in a contact list entry.

In a further example, when the navigation route includes a sightseeing tour, the input module 502 can calculate the affinity score 308 for each of the tour stops based on the received information from all tour participants. The input module 502 can calculate the affinity score 308 by adding the number of positive responses for the tour stop. In a similar example, when the navigation route includes a package delivery route, the candidate objectives 304 can be determined by the user uploading the candidate objectives 304 to the network 104 of FIG. 1 via the first device 102, the second device 106, or a combination thereof.

After determining the destination 202, the target arrival time 208, the participant 326, the candidate objectives 304, affinity score 308, or a combination thereof, the control flow can pass by storing the processing result from the input module 502 for access by the route calculation module 504. The control flow can further pass by notifying the route calculation module 504, such as by using a flag, an interrupt, a status signal, or a combination thereof. The control flow can further pass using a combination of the processes described above.

The route calculation module 504 is configured to generate the route to the destination 202. The route calculation module 504 can generate the route including the preferred route 206 of FIG. 2, the new route 318 of FIG. 3, or a combination thereof.

The route calculation module 504 can further generate the route including a set of route segments 214 of FIG. 2. The route calculation module 504 can generate the route based on calculating series of connected paths or segments, evaluating the series of paths or segments, selecting one path based on a criteria, presenting one or more of the paths and the evaluation results, or a combination thereof.

The route calculation module 504 can determine the typical flow rate 212 of FIG. 2 for the route segments 214. The route calculation module 504 can determine the typical flow rate 212 based on historical traffic data, the suggested speed limit, peer-to-peer traffic reporting, or a combination thereof.

For example, when a posted speed limit along surface streets within the city is listed at 35 MPH, the typical flow rate 212 can be determined to be 35 MPH. In a further example, during times of consistent heavy traffic along the surface streets, the typical flow rate 212 can be calculated to be 10 MPH based on historical traffic data. Also for example, the route calculation module 504 calculate the typical flow rate 212 based on direct feedback or report from vehicles in the corresponding area or the route segments 214, sensors or monitoring devices on the route segments 214, historical data of the route segments 214, or a combination thereof.

The route calculation module 504 can generate the route based on generating the candidate routes 210 of FIG. 2. The route calculation module 504 can use a method, a process, an equation, or a combination thereof predetermined by the navigation system 100 to generate the candidate routes 210. The route calculation module 504 can utilize the first control circuit 412, the location circuit 420 of FIG. 4, the second control circuit 434, or a combination thereof to generate the candidate routes 210.

For example, the route calculation module 504 can calculate one or more instances of the route from the starting location to the destination 202 based on an A* mechanism, a Bellman-Ford mechanism, a bidirectional mechanism, a Dijkstra's mechanism, a Floyd-Warshall mechanism, an iterative deepening mechanism, a shortest path mechanism, or a combination thereof. The route calculation module 504 can calculate one or more instances of the route in the candidate routes 210 each including the route segments 214 continuously connected from the starting point to the destination 202.

The route calculation module 504 can calculate the candidate routes 210 according to the primary travel mode 218 of FIG. 2. For example, the primary travel mode 218 can include travel by car or using a set of preferred public transportation options. As a more specific example, the route calculation module 504 can calculate the candidate routes 210 for traversal with a vehicle owned or operated by the user.

Also as a more specific example, the route calculation module 504 can calculate the candidate routes 210 based on publically available transportations driven or operated by a driver or a conductor other than the user, such as a taxi, a ride or a pick-up service, a bus route, a train route or schedule, a ferry route or schedule, or a combination thereof. The route calculation module 504 can calculate the candidate routes 210 based on various criteria, such as user's previous usage or familiarity, efficiency, monetary cost, travel time, or a combination thereof.

The route calculation module 504 can generate the preferred route 206 or the new route 318 based on selecting one of the candidate routes 210 meeting one or more parameters or criteria. The route calculation module 504 can generate the preferred route 206 for at least enabling the user to arrive at the destination 202 at or before the target arrival time 208.

For example, the route calculation module 504 can generate the candidate routes 210 as discussed above. The route calculation module 504 can calculate the minimum speed 222 required for each of the route segments 214 within each of the candidate routes 210.

As a more specific example, the route calculation module 504 can calculate the minimum speed 222 as an overall minimum speed for traversing an entirety of the corresponding candidate route based on an estimated travel start time or the current time, an overall distance of the corresponding candidate route, or a combination thereof. Also as a more specific example, the route calculation module 504 can further calculate the minimum speed 222 specific for each route segment based on adjusting the overall minimum speed according to a category or a type for the corresponding route segment, a length or a distance of the corresponding route segment, or a combination thereof.

Continuing with the more specific example, the calculation module 504 can further include a normalized weight factor corresponding to a road type or the speed limit of various route segments, such as 60 for freeways, 30 for residential roads, 45 for express ways, 25 for school zones, 5 for parking lots, 2.5 for walking paths, or a combination thereof. The calculation module 504 can further calculate or update the weight factor based on the typical flow rate 212, the traffic conditions 320, or a combination thereof. The calculation module 504 can calculate the minimum speed 222 for each of the segments within each of the candidate routes 210 based on a method or equation predetermined by the navigation system 100 for combining the normalized weight factor, the total distance of corresponding candidate route, total remaining time until the target arrival time, or a combination thereof.

For illustrative example, an instance of the candidate route with total distance of 20 miles with the target arrival time 1.5 hours from the current time. The route calculation module 504 can calculate the minimum speed 222 for the overall route as 13.3 miles-per-hour.

The candidate route can include a segment_A of 2 miles with the normalized weight factor of 12 corresponding to the typical flow rate 212, the traffic conditions 320, or a combination thereof for the current time, a highway_segment_B of 10 miles with the normalized weight factor of 60, an expressway_segment_C of 3 miles with the factor of 45, and a local_segment_D of 5 miles with the factor of 30.

Continuing with the illustrative example, the route calculation module 504 can calculate the minimum speed 222 for each of the segments based on solving for time of travel over each of the segments, which can be exemplified as:

$$\frac{2}{12x} + \frac{10}{60x} + \frac{3}{45x} + \frac{5}{30x} = 1.5$$

The route calculation module 504 can calculate the minimum speed 222 based on x=0.3778. The route calculation module 504 can calculate the minimum speed 222 for the segment_A as 4.534 mph, for the highway_segment_B as 22.67 mph, for the expressway_segment_C 17 mph, and for the local_segment_D as 11.34 mph. The route calculation module 504 can similarly calculate the minimum speed 222 based on implementing concepts of weighted average, linear algebra, or a combination thereof.

The route calculation module 504 can further calculate the travel time estimate 224 of FIG. 2 for each of the candidate routes 210 for evaluating the candidate routes 210. The route calculation module 504 can further calculate the travel time estimate 224 based on the typical flow rate 212 and the length of corresponding instance of the route segments 214. The travel time estimate 224 can be based on the product of the typical flow rate 212 and the length of the route segments 214. The route calculation module 504 can further utilize the travel time estimate 224 for identifying the preferred route 206 utilizing submodules as described below.

The route calculation module 504 can further include a time module 510, a multimodal module 512, an objective module 514, a risk module 516, or combination thereof. The route calculation module 504 can include one or more of the submodules to evaluate each of the candidate routes 210 according to various aspects or contexts. The route calculation module 504 can include one or more of the submodules to calculate a weighted route value 518 representing appropriateness or relevance of the corresponding route to the user based on the various aspect or contexts as processed by one or more of the submodules.

The weighted route value 518 can represent a value used for selecting the preferred route 206. The weighted route value 518 can include a weighting factor representing the percentage contribution to the weighted route value 518. The weighting factor can be based on predetermined percentages, input by the user, or a combination thereof.

The time module 510 is configured to evaluate the candidate routes 210 based on arriving at the destination 202 at or before the target arrival time 208. The time module 210 can evaluate based on the travel time estimate 224, the minimum speed 220, or a combination thereof.

The time module 510 can evaluate, such as by comparing the travel time estimate 224 for each of the candidate routes 210 or the minimum speed 220 and assign the weighted route value 518 to each of the candidate routes 210. The time module 510 can utilize the first control circuit 412, the second circuit 434, or a combination thereof for evaluating the candidate routes 210.

For example, the time module 510 can evaluate the candidate routes 210 relative to the target arrival time 208. The time module 510 can identify the routes within the candidate routes 210 corresponding to the travel time estimate 224 less than the target arrival time 208. The time module 510 can identify instances of the candidate routes 210 corresponding to the travel time estimate 224 less than the target arrival time 208 by a predetermined threshold, such as a percentage of the travel time estimate 224, a set duration based on the route or the destination 202, set duration based on the candidate objectives 304, or a combination thereof.

As a more specific example, the time module 510 can assign the weighted route value 518 with a diminishing value, such as a zero or a null set, to the routes with the travel time estimate 224 exceeding the target arrival time 208, the predetermined threshold buffer 520, or a combination thereof. The time module 510 can assign the weighted route value 518 to eliminate the routes that would lead to arrival after the target arrival time 208.

Also as a more specific example, the time module 510 can further evaluate the candidate routes 210 based on using the travel time estimate 224 as an aspect or a focus of analysis. The time module 510 can order the routes according to the travel time estimate 224, such as from fastest route to the slowest route. The time module 510 can calculate the weighted route value 518 according to the order, the ranking, the sequence of the routes according to the travel time estimate 224.

Also for example, the time module 510 can calculate the weighted route value 518 directly from or based on the travel time estimate 224. The time module 510 can include an equation, a process, a mechanism, or a combination thereof utilizing the travel time estimate 224 as an input parameter to calculate the weighted route value 518. The weighted route value 518 can be calculated with greater emphasis or better result for routes with shorter instance of the travel time estimate 224 according to a predetermined scale and reference for the weighted route value 518.

Also for example, the time module 510 can evaluate the candidate routes 210 based on the minimum speed 222 for each of the route segments 514 within each of the candidate routes 210. As a more specific example, the time module 510 can calculate a difference between the minimum speed 222 and the average speed limit, the typical flow rate 212, the traffic conditions 320, or a combination thereof for the overall route for each of the candidate routes. The time module 510 can calculate the weighted route value 518 for each of the candidate routes based on the difference value, total distance of the corresponding candidate route, or a combination thereof.

Also as a more specific example, the time module 510 can calculate a further difference between the minimum speed 222 and the average speed limit, the typical flow rate 212, the traffic conditions 320, or a combination thereof for each of the route segments 214 within each of the candidate routes 210. The time module 510 can calculate the weighted route value 518 for each of the candidate routes based on the further difference, a distance for the corresponding segment, a minimum or a maximum instance thereof, or a combination thereof.

The time module 510 can evaluate the candidate routes 210 corresponding to the primary travel mode 218 as discussed above. The time module 510 can further calculate and evaluate routes utilizing travel modes other than the primary travel mode 218. The time module 510 can calculate, evaluate, or utilize routes of other modes when initial instances of the candidate routes 210 for the primary travel mode 218 include only the routes corresponding to arrival after the target arrival time 208 or outside of the predetermined threshold buffer 520.

The time module 510 can evaluate the candidate routes 210 corresponding to the alternate travel mode 220 of FIG. 2. For example, the alternate travel mode 220 can include the route segments 214 utilizing public transportation or for hire services for the primary travel mode 218 corresponding to the user traveling by self-owned or self-operated vehicle. In a further example, the alternate travel mode 220 can include travel via train, taxi, bus, ferry, private networked transportation services, such as Uber, or a combination thereof not familiar to, not previously utilized, or a combination thereof for the user. As a more specific example, the time module 510 can evaluate the candidate routes 210 including the user driving his or her car a portion of therein, utilizing public transportation or taxi service for another portion therein.

The multimodal module 512 is configured to evaluate the candidate routes 210 based on the travel costs 302 of FIG. 3. The multimodal module 512 can calculate the travel costs 302 required to traverse each of the candidate routes 210.

The multimodal module 512 can calculate the travel costs 302 based on the received information stored within the device, communicated using the network 104, or a combination thereof. For example, the multimodal module 512 can calculate the travel costs 302 using database information on cost per mileage estimates or using communication with online parking payment services.

In a further example, the multimodal module 512 can calculate the travel costs 302 by communication with third party management software to access vehicle battery percentages or health management goals, such as set number of total steps taken in a day. Also for example, the multimodal module 512 can calculate the travel costs 302 by identifying instances of the route segments 214 involving walking, stairs, incline, elevators or escalators, or a combination thereof. The multimodal module 512 can calculate the travel costs 302 based on the distance of the segment, type of activity required by the user, a predetermined rate of energy consumption for the activity, or a combination thereof.

The multimodal module 512 can calculate the weighted route value 518 for each of the candidate routes 210 based on the travel costs 302, the travel time estimate 224, or a combination thereof. The weighted route value 518 can be based on predetermined weighting factors, interface with third party software used to optimize goals, input by the user, or a combination thereof.

For example, when the travel costs 302 include monetary value, the user can indicate a preference for the route to minimize out of pocket expenses. The multimodal module 512 can calculate the weighted route value 518 to apply a higher weight to incidental costs, such as parking fees, toll road fees, or a combination thereof and a lower weight to operational costs, such as gas consumption and vehicle maintenance.

Continuing with the example, the multimodal module 512 can also calculate the travel costs 302 associated with travel modes other than the primary travel mode 218 for traversing to the destination 202. As a more specific example, the travel costs 302 can include the monetary value associated with arriving at the destination 202 via the train, the taxi, the bus, the ferry, the private networked transportation services, or a combination thereof. Also as a more specific example, the travel costs 302 can include physical activity or labor associated with arriving at the destination 202.

In a further example, when the travel costs 302 include the battery charge in the electric vehicle with a generative braking system, a vehicle type can predetermine the weighting factors for the navigation route. The multimodal module 512 can calculate the weighted route value 518 to apply the higher weight to routes with long declines and multiple stops.

In a similar example, when the travel costs 302 include physical effort, the multimodal module 512 can interface with the third party software to set the weighting factors to increase the health management goals. The multimodal module 512 can calculate the weighted route value 518 by providing the higher weight to the candidate routes 210 with the travel time estimates 224 allowing arrival at the destination 202 with enough spare time to encourage the user to park and take a short walk to the destination 202.

The multimodal module 512 can further calculate the weighted route value 518 based on a context representing a scenario, a purpose, or a goal for arriving at the destination 202. The multimodal module 512 can calculate the weighted route value 518 according to a significance value associated with various costs specific to the context.

For example, the multimodal module 512 can include various contexts including typical contextual parameters. As a more specific example, the multimodal module 512 can include the context including keywords, times, locations, or a combination thereof for identifying meetings with potential clients or larger size clients, personal or entertainment meetings or appointments, a popular or limited-time events associated with difficulty in scheduling or limited resources, or a combination thereof.

Continuing with the example, the multimodal module 512 can analyze a current state or input associated with the user for identifying the matching context in traversing to the destination 202. As a more specific example, the multimodal module 512 can identify the matching context based on comparing the context identifiers to the current time, time or location of the event or meeting associated with the destination 202 or the target arrival time 208, the participant 326, the user's communications, any keywords or labels associated with the calendar event, or a combination thereof.

Continuing with the example, the multimodal module 512 can further include the significance value for various instances of the costs specific to the context. As a more specific example, the multimodal module 512 can include the significance value balancing more importance on travel time than physical energy, and more importance on physical energy than monetary cost for professional or client meetings.

Also as a more specific example, the multimodal module 512 can include the significance value balancing more importance on physical energy and minimizing the monetary cost than travel time for casual or personal events with people identified as personal or close contacts. Also as a more specific example, the multimodal module 512 can update and calculate the significance value for each context or situation based on previous interactions with the user or other members similar to the user, such as in selecting a route, a direct feedback regarding the importance, or a combination thereof.

The multimodal module 512 can interface the with the third party management system using the network 104, the first communication circuit 416 of FIG. 4, the second communication circuit 436 of FIG. 4, the first device transmission 408 of FIG. 4, the second device transmission 410 of FIG. 4, or a combination thereof. The multimodal module 512 can utilize the first control circuit 412, the second control circuit 434, or a combination thereof for calculating the travel costs 302 and the weighted route value 518.

The objective module 514 is configured to evaluate the candidate routes 210 based on the candidate objectives 304. The objective module 514 can receive the candidate objectives 304 and affinity score 308 for each of the candidate objectives 304 from the input module 502.

The objective module 514 can calculate the weighted route value 518 for each of the candidate routes 210 based on the affinity score 308, the candidate objectives 304, the travel time estimate 224, or a combination thereof. For example, when the candidate objectives 304 include stopping along the sightseeing tour, the objective module 514 can calculate the weighted route value 518 where the weighting factor is scaled with the popularity of stops with the tour participants. In a further example, when the candidate objectives 304 include delivering the largest number of high priority packages along the route, the objective module 514 can calculate the weighted route value 518 based on the priority of the package along the route.

The objective module 514 can utilize the first control circuit 412, the second control circuit 434, or a combination thereof to calculate the affinity score 308 to the stop and generate the preferred route 206. The objective module 514 can store the affinity score 308 using the first storage circuit 414, the second storage circuit 446, or a combination thereof.

The risk module 516 is configured to evaluate the candidate routes 210 based on the estimated risk 306 of FIG. 3. The risk module 516 can calculate the estimated risk 306 associated with each of the candidate routes 210. The risk module 516 can calculate the estimated risk 306 based on the received information for the route segments 214 within the candidate routes 210.

For example, received information for the road type, the suggested speed limit, or calls to service can used to calculate the estimated risk 306. Each risk type can be assigned a weighting factor and a scalable estimate of risk based the degree of risk. The degree of risk can represent a numerical value based on the number of accidents on the road type, the number of calls to service along the route segments 214, or the speed of each of the route segments 214. The risk module 516 can utilize the network 104, the first communication circuit 416, the second communication circuit 436, or a combination thereof to access online databases to receive information.

The risk module 516 can calculate the weighted route value 518 for the candidate routes 210 based on the estimated risk 306, the travel time estimate 224, or a combination thereof. For example, the risk module 516 can assign a scalable rating for each of the route segments 214. The scalable rating and weighting factor for the weighted route value 518 can be based on user preferences, preset values, or a combination thereof.

The route calculation module 504 can identify the preferred route 206 based on the travel time estimate 224 and the weighted route value 518 resulting from one or more of the submodules therein. The route calculation module 504 can identify the preferred route 206 based on combining the weighted route value 518 from the various submodules or target-specific evaluations thereof for each of the candidate routes 210. The route calculation module 504 can identify the preferred route 206 as the route in the candidate routes 210 with highest or most optimal combined weighted route values. The route calculation module 504 can use one or more of the submodules therein to balance various factors important to the user according to the context corresponding to arriving at the destination 202.

For example, when the travel time estimate 224 exceeds the remaining time 314 of FIG. 3, the route calculation module 504 can discard the route from the collection of the candidate routes 210. In a further example, the route calculation module 504 can select one route based on the highest weighted value. In another example, the route calculation module 504 can allow the user to choose the preferred route 206 from a list of the routes with the highest weighted route values, or the list of the routes ordered or ranked according to the weighted route values 518.

As a more specific example, the route calculation module 504 can calculate the candidate routes 210 for the primary travel mode 218. The time module 510 can calculate the travel time estimate 224 and identify the routes estimated to allow user to arrive by the target arrival time 208. If needed, the route calculation module 504 can recalculate the candidate routes 210 to include routes utilizing non-primary travel mode or multiple travel modes, and the time module 510 can calculate the travel time estimate 224 and repeat the analysis.

Continuing with the more specific example, the multimodal module 512 can calculate the weighted route values 518 according to the context to evaluate the routes according to importance of various factors specific to the context. The objective module 514 can calculate the weighted route values 518 reflecting the personal preference and affinity associated for each of the routes. The risk module 516 can calculate the weighted route values 518 reflecting various risks or dangers associated with the route or user's actions associated with the route.

Continuing with the more specific example, the route calculation module 504 can use the combination of the various evaluation results to generate the preferred route 206 from the candidate routes 210. The route calculation module 504 can use the combination of the various evaluation results to generate the preferred route 206 matching or most appropriate for the context associated with arriving at the destination 202 by the target arrival time 208.

The route calculation module 504 can further include an alternative configuration for processing the preferred route 206. For example, the route calculation module 504 can include the time module 510 integral with the route calculation module 504. The route calculation module 504 can calculate the candidate routes 210 as discussed above. The route calculation module 504 can calculate the distance of each route as discussed above.

Continuing with the example, the route calculation module 504 can calculate an adjusted measure or normalized measure corresponding to the minimum speed 222 for each segment of each route. As a more specific example, the adjusted measure or normalized measure can represent a ratio or a discrepancy between the speed limit 216 of FIG. 2 or average flow speed of each corresponding road segment in each of the candidate routes 210 at the time of travel.

Continuing with the example, the route calculation module 504 can keep or hold the target arrival time 208 affixed, with or without additional buffer time. The route calculation module 504 can calculate the minimum speed 222 necessary to arrive at the destination 202 by the target arrival time 208, within the predetermined threshold buffer 520, or a combination thereof. The route calculation module 504 can adjust the travel speed according to the adjusted measure to calculate the updated speed 316 for each corresponding segment. The updated speed 316 of FIG. 3 represents lowest possible speed of travel required to arrive at the destination 202 at or before the target arrival time 208.

Continuing with the example, the route calculation module 504 can adjust the set of the candidate routes 210 by eliminating the instances of routes with the minimum speed 222 or the updated speed 316 equal to or greater than the speed limit 216 or the average flow rate at the travel time, within a threshold range thereof, or a combination thereof. The route calculation module 504 can repeat the route calculation with other modes of travel as described above when the set of the candidate routes 210 is empty. The route calculation module 504 can similarly calculate the weighted route values 518 for each of the candidate routes 210 and select the preferred route 206 as described above.

After generating the preferred route 206, the control flow can further pass to the monitor module 506 by notifying the monitor module 506, such as by using a flag, an interrupt, a status signal, or a combination thereof. The control flow can further pass using a combination of the processes described above.

The monitor module 506 is configured to monitor the progress of the user along the navigation route. The monitor module 506 can monitor the remaining route 310 of FIG. 3 for the traffic conditions 320 of FIG. 320. For example, the monitor module 506 can monitor the progress along the navigation route by updating the current location, updating the remaining route 310, updating the minimum speed 222 or initiating the update, or a combination thereof. Also for example, the monitor module 506 can monitor the progress based on monitoring the traffic conditions 320 using changes in the rate of travel, sensing technologies, on-board computer vision methods, peer-to-peer network among vehicles, or a combination thereof.

In a further example, the monitor module 506 can monitor the traffic conditions 320 by comparison of time, speed, distance, location, or a combination thereof for the remaining route 310. The monitor module 506 can compare values of time, speed, distance, location, and compare the values to determine the traffic conditions 320.

Continuing with the example, the monitor module 506 can monitor the traffic conditions 320 by accessing detectors or sensors along the route. The monitor module 506 can utilized inductive loop detection, video vehicle detection, Bluetooth detection, audio detection, or a combination thereof for monitoring the traffic conditions 320.

Also in a more specific example, the monitor module 506 can monitor the traffic conditions 320 using on-board vision methods. The monitor module 506 can monitor the traffic conditions 320 utilizing tracking algorithms based on model, region, active-contour, feature, or a combination thereof from image sequences.

Continuing with the example, the monitor module 506 can monitor the traffic conditions 320 based on peer-to-peer network among vehicles including floating car or cellular network data. The monitor module 506 can monitor the traffic conditions 320 based on triangulation, vehicle re-identification, GPS methods, smartphone accelerometer data, or a combination thereof.

The monitor module 506 can further implement updates for the minimum speed 222 required for arriving at the destination 202. The monitor module 506 can use one or more of the submodules described below to implement updates for the minimum speed 222.

When the updated speed 316 exceeds the speed limit 216 or the typical flow rate 212, the monitor module 506 can notify the route calculation module 504 to adjust the preferred route 206 or generate the new route 318 for arrival at the target arrival time 208 or within the predetermined threshold buffer 520. When all available routes do not allow for arrival before the target arrival time 208 or within the predetermined threshold buffer 520, the monitor module 506 can notify the participant 326 associated with the route of the delayed arrival or missed arrival. The monitor module 506 can accomplish updating and notification of the route navigation using submodules, as described below.

The monitor module 506 can further include an update module 522, a notification module 524, or a combination thereof for monitoring the progress along the navigation route. The monitor module 506 can use the sub-modules when the various input data matches the scenario as predetermined by the navigation system 100.

The update module 522 is configured to update the speed, the time, the location, the distance, or a combination thereof along the remaining route 310. The update module 522 can determine the current speed, the minimum speed 222, the updated speed 316, the current location 204, the remaining distance 312, the remaining time 314, the travel time estimate 224, or a combination thereof for the remaining route 310.

For example, the update module 522 can determine the current speed based on GPS Doppler Shift methods or GPS position tracking methods. In a further example, the update module 522 can calculate the minimum speed 222 based on the remaining distance 312 divided by the remaining time 314 for the navigation route. Continuing with the example, the update module 522 can calculate the travel time estimate 224 based on the remaining distance 312 multiplied by the typical flow rate 212.

The update module 522 can update or re-calculate the minimum speed 222. For example, the update module 522 can update or re-calculate the minimum speed 222 similarly as described above for the route calculation module 504.

Also for example, the monitor module 506 can update or re-calculate the minimum speed 222 by passing the current location 204 to the route calculation module 504. The route calculation module 504 can update or re-calculate the minimum speed 222 based on the current location 204 and the remaining route 310 as described above and then pass the resulting updated instance of the minimum speed 222 back to the update module 522.

The update module 522 can compare the speed, the time, the location, or the distance along the route. The update module 522 can compare the speed, the time, the location, or the distance along the remaining route 310 to evaluate ability for the user to arrive at the destination 202 by the target arrival time 208 or within the predetermined threshold buffer 520.

For example, the update module 522 can compare the minimum speed 222 with the speed limit 216, the typical flow rate 212, or a combination thereof along the remaining route 310. In a further example, the update module 522 can compare the travel time estimate 224 for the remaining route 310 with the remaining time 314.

The update module 522 can generate the threshold condition 322 of FIG. 3 for utilizing the new route 318. The update module 522 can generate the threshold condition 322 based on the rate of change between remaining slow miles to fast miles, the traffic conditions 320, comparisons of the minimum speed 222 with the maximum speed limit, the travel time estimate 224, or a combination thereof. The update module 522 can communicate the threshold condition 322 for remaining on the current route before needing to take the new route 318 in order to reach the destination 202 at the target arrival time 208.

For example, in an area of heavy traffic flow, the update module 522 can generate the threshold condition 322 to communicate to the user how long the user can remain in traffic and still arrive at the destination 202 by the target arrival time 208. In a further example, when the current speed falls below the typical flow rate 212, the route calculation module 504 can generate the new route 318 and the update module 522 can generate the threshold condition 322 and communicate the threshold condition 322 to the user when the new route 318 must be taken to arrive at the destination 202 on time.

The update module 522 can generate the threshold condition 322 based on calculating a best-fit function corresponding to the remaining distance 312, the minimum speed 222, a change or a pattern thereof, or a combination thereof leading up to the current time. For illustrative example, the update module 522 can generate the threshold condition 322 by calculating the best-fit function utilizing a second-degree polynomial regression mechanism.

As a more specific example, the update module 522 can calculate a best-fit function based on the remaining distance 312, the remaining time 314, the minimum speed 222 corresponding to the remaining time 314, a change or a pattern thereof, according to elapsed time and traveled distance, a rate thereof, or a combination thereof in light of a delay or a backup along the route. The update module 522 can evaluate a rate of change for the best-fit function or a first derivative thereof, resulting in the changing patterns of the minimum speed 222 for the best-fit function describing distance or location as a function of time. The update module 522 can evaluate the patterns of the minimum speed 222 against a predetermined threshold to generate the threshold condition 322.

The update module 522 can utilize the first communication circuit 428, the first control circuit 422, the second communication circuit 436, the second control circuit 434, or a combination thereof for updating the speed, the time, the location, and the distance. The update module 522 can utilize the first control circuit 422, the second control circuit 434, or a combination thereof for generating the threshold condition 322. The update module 522 can store the updated values and the threshold condition 322 utilizing the first storage circuit 414, the second storage circuit 446, or a combination thereof. The update module 522 can use Boolean logic, fuzzy logic, algebraic relationship, or a combination thereof to compare the speed, the time, the location, the distance, or a combination thereof.

The control flow can pass to the notification module 524. The notification module 524 is configured to communicate changes in the time, the speed, the distance, the threshold condition 322, or a combination thereof to the user, the participant 326, the network 104, the route calculation module 504, or a combination thereof.

The notification module 524 can generate the notice 324 of FIG. 3 based on the comparison of the speed, the time, the distance, or a combination thereof, an availability of the preferred route 206, or a combination thereof. For example, when the minimum speed 222 exceeds the speed limit 216 or the typical flow rate 212, the monitor module 506 can send a flag, alert, or trigger to the route calculation module 504 to update the preferred route 206 or generate the new route 318 from the candidate routes 210.

In a further example, when the travel time estimate 224 exceeds the remaining time 314 available for the route, the monitor module 506 can send a flag, alert, or trigger to the route calculation module 504 to update the preferred route 206 or generate the new route 318. Continuing with the example, the route calculation module 504 can recalculate the candidate routes 210 to include routes utilizing non-primary travel mode or multiple travel modes.

The notification module 524 can identify the participant 326 associated with the route. The notification module 524 can identify the participant 326 based on user input, calendar event detail, contact list information, contextual information, keyword matching, location device matching, or a combination thereof. For example, the notification module 524 can identify the participant 326 through an address listed in the contact list information matching the destination 202. In a further example, the notification module 524 can identify the participant 326 through matching phrases or keywords such as "see you soon" in a text.

The notification module 524 can communicate the missed or delayed arrival to the participant 326 associated with the destination 202 when none of the candidate routes 210 allow the user to arrive at the destination 202 at the target arrival time 208. The notification module 524 can communicate the missed arrival or delayed arrival through textual communication, rescheduling of the calendar event, notifying the network 104, or a combination thereof.

The notification module 524 can use the first user interface 418, the first communication circuit 416, the first control interface 422, the location interface 432, the storage interface 424, the second communication circuit 436, the second user interface 438, the second control interface 444, second storage interface 448, or a combination thereof to communicate the late arrival or the missed arrival. The notification module 524 can use the first communication circuit 416, the first control circuit 412, the second communication circuit 436, the second control 434, or a combination thereof to reschedule the event.

It has been discovered that generating the preferred route 206 based on the target arrival time 208 for arriving at the destination 202 as a fixed basis instead of as a consequential processing results provides increased usability in navigating to a geographic location. The navigation system 100 can utilize the minimum speed 222 as a controlling factor for determining the preferred route 206. Based on satisfying the target arrival time 208, the navigation system 100 can evaluate other costs, objectives, or risks associated with the routes to mimic or duplicate human decision making process. This distinction can ensure arrival at the destination 202 while selecting the preferred route 206 preferred by the user.

It has been further discovered that calculating the minimum speed 222 corresponding to the route segments 214 provides realistic real-time metrics that can be instantly used to evaluate the driving and the traffic flow. The navigation system 100 can calculate the minimum speed 222 or the updated speed 316 to direct the user to the rate of travel needed to reach the destination 202 at or before the target arrival time 208. The minimum speed 222 can provide better metric for comparing the current speed or progress rather than an overall projected arrival time or just a remaining distance. Knowledge of the minimum speed 222 can further the user to actively make up for delays along the navigation route by adjusting the rate of travel or the navigation route and ensure timely arrival at the destination 202.

It has been further discovered that generating the preferred route 206 based on a paradigm of using fixed arrival time as a basis along with the travel costs 302 and the travel time estimate 224 provides efficient scheduling and cost savings for coordinating multiple resources. The navigation system 100 can generate the preferred route 206 to include additional constraints allowing the user to establish goals or provide benefits in addition to arriving at the destination 202. For scheduling and managing multiple resources, such as for delivery or shipping applications, the fixed arrival time can be utilized to guarantee time or events, such as for delivering perishable goods or operating self-driving/maneuvering vehicles or drones, and the minimization of costs such as fuel, idle time, other resulting delays, or a combination thereof. The preferred route 206 based on the fixed arrival time can further provide the efficient scheduling and cost savings for routing emergency vehicles, scheduling delivery of large-scale payload, other implementations requiring a balance of storage and usage, or a combination thereof.

It has been further discovered that generating the preferred route 206 based on the affinity score 308 for the candidate objectives 304 and the travel time estimate 224 provides ability to balance various differing objectives or activities mirroring human decision processes. The navigation system 100 can generate the preferred route 206 based on the affinity score 308 to prioritize points along the navigation route, include higher priority points, delete lower priority points, or a combination thereof. This distinction ensures the capability for the user to maximize the value of the points between the starting point and the destination 202. The navigation system 100 can further provide the preferred route 206 for balancing desires or affinity for a group of people traveling the same route, such as in a tour group.

It has been further discovered that updating the preferred route 206 and the minimum speed 222 along with the threshold condition 322 utilizing the best-fit function for the traffic conditions 320 provides added usability for the user. The navigation system 100 can continuously evaluate the set of paths to the destination 202, proactively offering one or more alternate paths with greater flow capacity. This distinction ensures real time monitoring of the traffic conditions 320 without extensive data management. Further the navigation system 100 can further provide the user with accurate triggers or timing for pursuing the new path to ensure arrival by the target arrival time.

It has been further discovered that generating the notice 324 based on the updated speed 316 exceeding the speed limit 216 for the remaining route 310 provides added safety for the user. The navigation system 100 can generate the notice 324 to the participant 326 associated with the destination 202 and communicate the delayed arrival or missed arrival without user intervention. This distinction ensures added safety for the user as it relieves the user of the burden of notifying or rescheduling an event while operating the primary travel mode 218.

It has been further discovered that generating the preferred route 206 for coordinating the alternate travel mode 220 provides added convenience for the user. Coordinating the alternate travel mode 220 can include booking arrangements and scheduling transfers between travel modes. The navigation system 100 can allow the user all possible modes of travel to reach the destination 202 by the target arrival time 208, and further implement or schedule travel by multiple modes of transportation. This distinction ensures that the user is not burdened with additional tasks required to reach the destination 202.

It has been further discovered that generating the threshold condition 322 based on the best-fit function for utilizing the new route 318 further ensures on-time arrival for the user. The user has direct knowledge of the time interval that he can remain in the traffic conditions 320 and still arrive by the target arrival time 208. Further, the best-fit function and the changing behavior can provide predictive element and a required action by the user in light of the predictions based on the best-fit function. This distinction ensures improved traffic avoidance capacity for the user.

Figure 6:
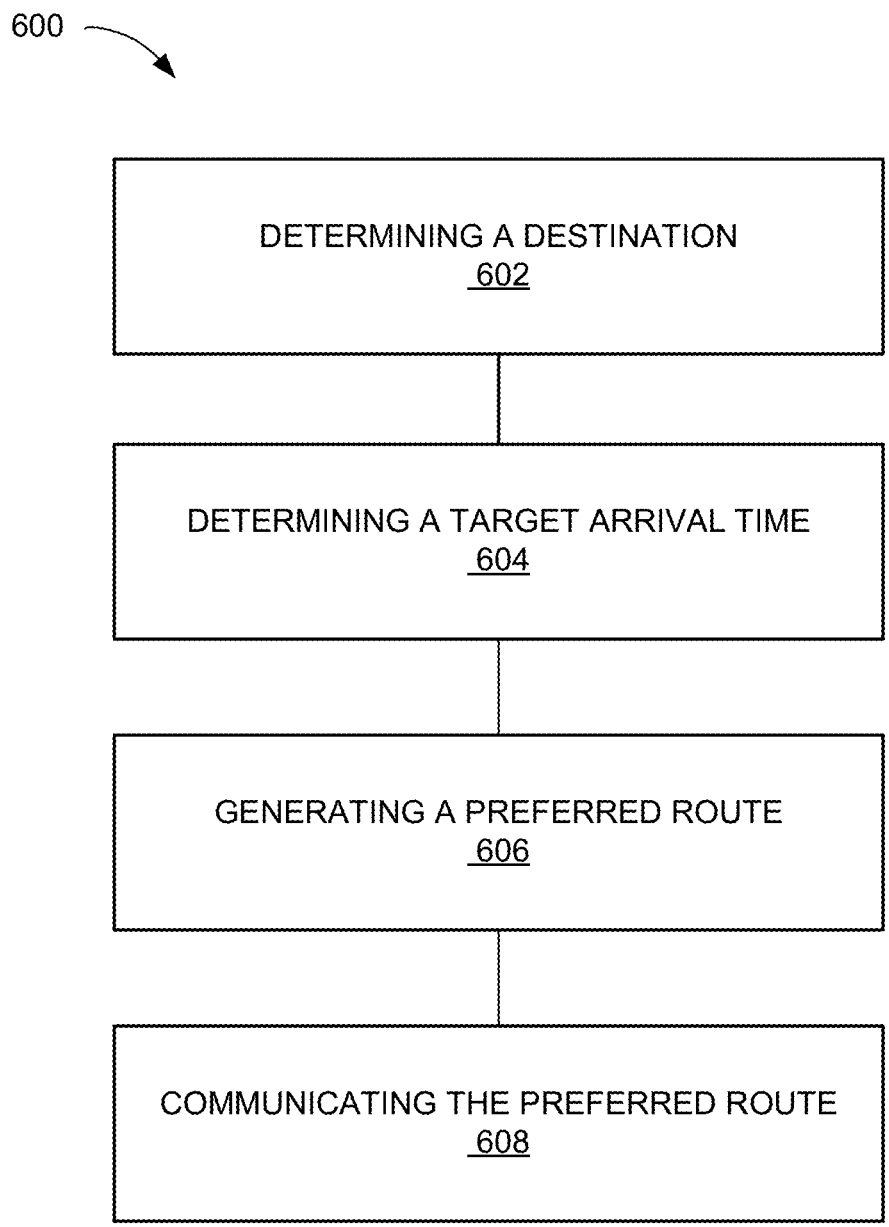
FIG. 6 is a flow chart of a method of operation of a navigation system in an embodiment of the present invention.

Referring now to FIG. 6, therein is shown a flow chart of a method 600 of operation of a navigation system 100 of FIG. 1 in an embodiment of the present invention. The method 600 includes: determining a destination represented in a box 602, determining a target arrival time for traversing to the destination represented in a box 604, generating a preferred route based on the target arrival time for arriving at the destination using the preferred route at or before the target arrival time represented in a box 606; and communicating the preferred route for providing navigational guidance to the destination represented in a box 608.

The modules described in this application can be hardware implementation or hardware accelerators, including passive circuitry, active circuitry, or both, in the first storage circuit 414 of FIG. 4, the second storage circuit 446 of FIG. 4, the first control circuit 412 of FIG. 4, the second control circuit 434, of FIG. 4, or a combination thereof. The modules can also be hardware implementation or hardware accelerators, including passive circuitry, active circuitry, or both, within the first device 102 of FIG. 1, the second device 106 of FIG. 1, or a combination thereof but outside of the first storage circuit 414, the second storage circuit 446, the first control circuit 412, the second control circuit 434, or a combination thereof.

The navigation system 100 has been described with module functions or order as an example. The navigation system 100 can partition the modules differently or order the modules differently. For example, the navigation system 100 can utilize the update module 522 and notification module 524 as main modules instead of sub-modules. The monitor module 506 can trigger the update module 522 to recalculate parameters based on the traffic conditions 320. Also for example, the navigation system 100 can implement the input module 502, the route calculation module 504, and monitor module 506 or a combination thereof in parallel, in series, or a combination of configuration thereof relative to each other.

For illustrative purposes, the various modules have been described as being specific to the first device 102 or the second device 106. However, it is understood that the modules can be distributed differently. For example, the various modules can be implemented in a different device, or the functionalities of the modules can be distributed across multiple devices. Also as an example, the various modules can be stored in a non-transitory memory medium.

As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware circuit, such as a chip or a processor, or across multiple hardware circuit.

The modules described in this application can be stored in the non-transitory computer readable medium. The first storage circuit 414, the second storage circuit 446, or a combination thereof can represent the non-transitory computer readable medium. The first storage circuit 414, the second storage circuit 446, or a combination thereof, or a portion therein can be removable from the first device 102, the second device 106, or a combination thereof. Examples of the non-transitory computer readable medium can be a non-volatile memory card or stick, an external hard disk drive, a tape cassette, or an optical disk.

The physical transformation of the target arrival time 208 for generating the preferred route 206 results in the movement in the physical world, such as for the preferred route 206 displayed or recreated for the user on one or more of the devices or physical displacement of the user carrying the first device 102 in following the preferred route 206. Movement in the physical world results in updates to the traffic conditions 320, the current location 204, the updated speed 316, or a combination thereof which can be fed back into the navigation system 100 and further influence or update the current-estimated arrival time, the preferred route 206, the new route 318, or a combination thereof.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation for a navigation system comprising:
   determining a destination;
   determining a fixed target arrival time for traversing to the destination;
   generating, with a route calculation module, a preferred route based on the fixed target arrival time for arriving at the destination using the preferred route at or before the fixed target arrival time, and wherein the preferred route includes route segments, each associated with a minimum speed;
   monitoring, with a monitoring module, a remaining route for traffic conditions along the route segments;
   calculating an updated speed, with an update module, for the remaining route based on the traffic conditions for replacing the minimum speed for each route segment, the updated speed for arriving at the destination at or before the fixed target arrival time;
   generating a new route with the route calculation module, based on a threshold condition, wherein the threshold condition represents a limit for evaluating or implementing the new route in order to arrive at the destination by the fixed target arrival time, and wherein the threshold condition is based on a rate of change in the minimum speed for the remaining route; and
   communicating, with a notification module, one or more of the preferred route or the new route for providing navigational guidance to the destination.

2. The method as claimed in claim 1 wherein the threshold condition is further based on one or more of a remaining distance, a remaining time, or a typical flow rate.

3. The method as claimed in claim 1 wherein generating the preferred route includes:
   calculating candidate routes for traveling to the destination;
   calculating travel costs required to traverse each of the candidate routes;
   calculating a travel time estimate for each of the candidate routes; and
   generating the preferred route by selecting one of the candidate routes based on the travel costs and the travel time estimate.

4. The method as claimed in claim 1 wherein generating the preferred route includes:
   calculating candidate routes including candidate objectives;
   calculating a travel time estimate for each of the candidate routes with the candidate objectives;
   calculating an affinity score for each of the candidate objectives; and
   generating the preferred route by selecting one of the candidate routes based on the affinity score and the travel time estimate.

5. The method as claimed in claim 1 wherein generating the preferred route includes:
   calculating candidate routes including a travel time estimate corresponding to each of the candidate routes;
   calculating an estimated risk associated with each of the candidate routes; and
   generating the preferred route by selecting one of the candidate routes based on the travel time estimate.

6. The method as claimed in claim 1 further comprising generating a notice based on a late arrival time past the fixed target arrival time.

7. The method as claimed in claim 1 further comprising:
   calculating candidate routes from a current location based on the updated speed exceeding one or more of a speed limit or a typical flow rate for the remaining route; and
   updating the preferred route or the new route from the candidate routes.

8. The method as claimed in claim 6 further comprising identifying a participant associated with the fixed target arrival time and communicating the notice to the participant.

9. The method as claimed in claim 6 wherein:
   generating the preferred route includes generating the preferred route corresponding to a primary travel mode;
   calculating candidate routes including an alternate travel mode; and
   coordinating the alternate travel mode.

10. The method as claimed in claim 1 wherein monitoring the remaining route for traffic conditions includes monitoring based on a peer-to-peer network among vehicles.

11. A navigation system comprising:
    a control circuit configured to:
       determine a destination;
       determine a fixed target arrival time for traversing to the destination;
       generate a preferred route based on the fixed target arrival time for arriving at the destination using the preferred route at or before the fixed target arrival time, and wherein the preferred route includes route segments, each associated with a minimum speed;
       monitor a remaining route for traffic conditions along the route segments;
       calculate an updated speed for the remaining route based on the traffic conditions for replacing the minimum speed for each route segment, the updated speed for arriving at the destination at or before the fixed target arrival time;
       generate a new route based on a threshold condition, wherein the threshold condition represents a limit for evaluating or implementing the new route in order to arrive at the destination by the fixed target arrival time, and wherein the threshold condition is based on a rate of change in the minimum speed for the remaining route; and an interface, coupled to the control circuit, configured to communicate one or more of the preferred route or the new route for providing navigational guidance to the destination.

12. The system as claimed in claim 11 wherein the threshold condition is further based on one or more of a remaining distance, a remaining time, or a typical flow rate.

13. The system as claimed in claim 11 wherein the control circuit is configured to:
   calculate candidate routes for traveling to the destination;
   calculate travel costs required to traverse each of the candidate routes;
   calculate a travel time estimate for each of the candidate routes; and
   generate the preferred route by selecting one of the candidate routes based on the travel costs and the travel time estimate.

14. The system as claimed in claim 11 wherein the control circuit is configured to:
   calculate candidate routes including candidate objectives;
   calculate a travel time estimate for each of the candidate routes with the candidate objectives;
   calculate an affinity score for each of the candidate objectives; and
   generate the preferred route by selecting one of the candidate routes based on the affinity score and the travel time estimate.

15. The system as claimed in claim 11 wherein the control circuit is configured to:
   calculate candidate routes including a travel time estimate corresponding to each of the candidate routes;
   calculate an estimated risk associated with each of the candidate routes; and
   generate the preferred route by selecting one of the candidate routes based on the travel time estimate.

16. A non-transitory computer readable medium including instructions for a navigation system comprising:
   determining a destination;
   determining a fixed target arrival time for traversing to the destination;
   generating a preferred route based on the fixed target arrival time for arriving at the destination using the preferred route at or before the fixed target arrival time, and wherein the preferred route includes route segments, each associated with a minimum speed;
   monitoring a remaining route for traffic conditions along the route segments;
   calculating an updated speed for the remaining route based on the traffic conditions for replacing the minimum speed for each route segment, the updated speed for arriving at the destination at or before the fixed target arrival time;
   generating a new route based on a threshold condition, wherein the threshold condition represents a limit for evaluating or implementing the new route in order to arrive at the destination by the fixed target arrival time, and wherein the threshold condition is based on a rate of change in the minimum speed for the remaining route; and
   communicating one or more of the preferred route or the new route for providing navigational guidance to the destination.

17. The non-transitory computer readable medium including the instructions as claimed in claim 16 wherein the threshold condition is further based on one or more of a remaining distance, a remaining time, or a typical flow rate.

18. The non-transitory computer readable medium including the instructions as claimed in claim 16 wherein generating the preferred route includes:
   calculating candidate routes for traveling to the destination;
   calculating travel costs required to traverse each of the candidate routes;
   calculating a travel time estimate for each of the candidate routes; and
   generating the preferred route by selecting one of the candidate routes based on the travel costs and the travel time estimate.

19. The non-transitory computer readable medium including the instructions as claimed in claim 16 wherein generating the preferred route includes:
   calculating candidate routes including candidate objectives;
   calculating a travel time estimate for each of the candidate routes with the candidate objectives;
   calculating an affinity score for each of the candidate objectives; and
   generating the preferred route by selecting one of the candidate routes based on the affinity score and the travel time estimate.

20. The non-transitory computer readable medium including the instructions as claimed in claim 16 wherein generating the preferred route includes:
   calculating candidate routes including a travel time estimate corresponding to each of the candidate routes;
   calculating an estimated risk associated with each of the candidate routes; and
   generating the preferred route by selecting one of the candidate routes based on the travel time estimate.

* * * * *